Patented June 18, 1935

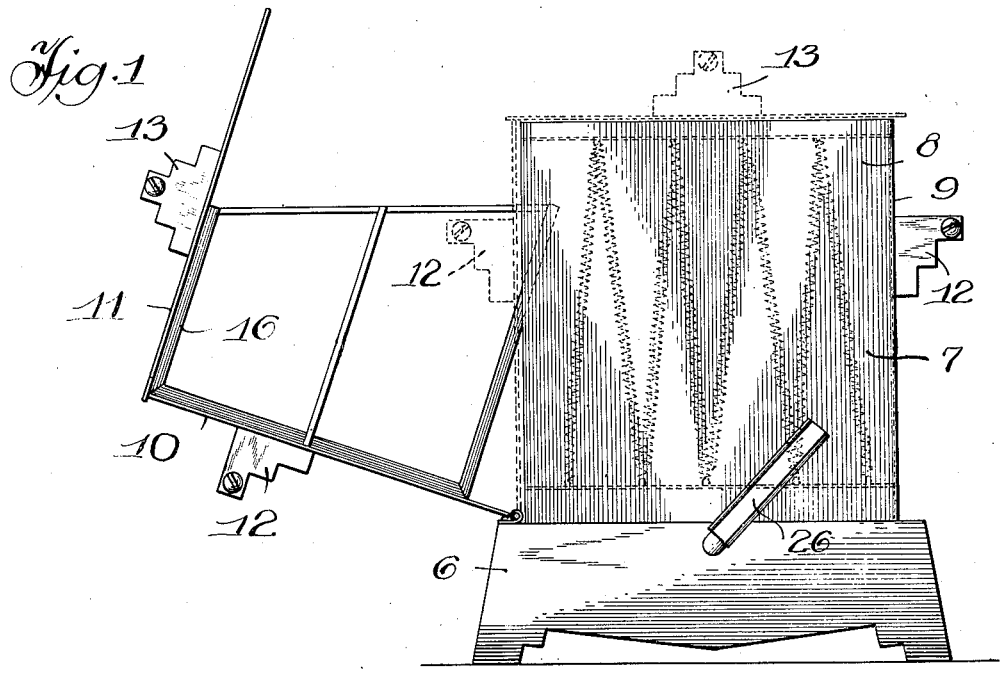
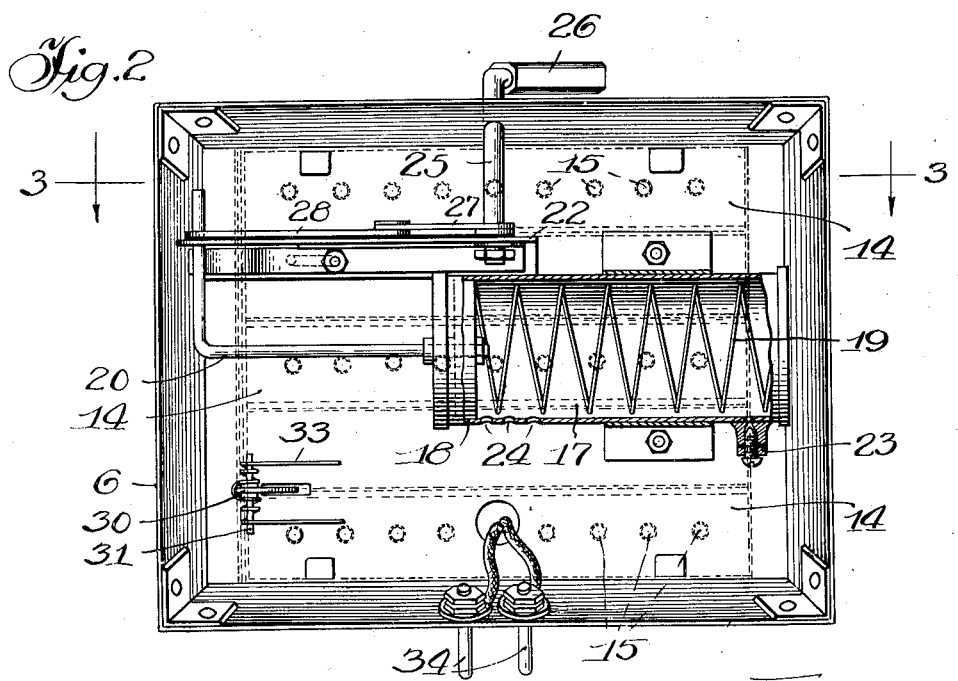

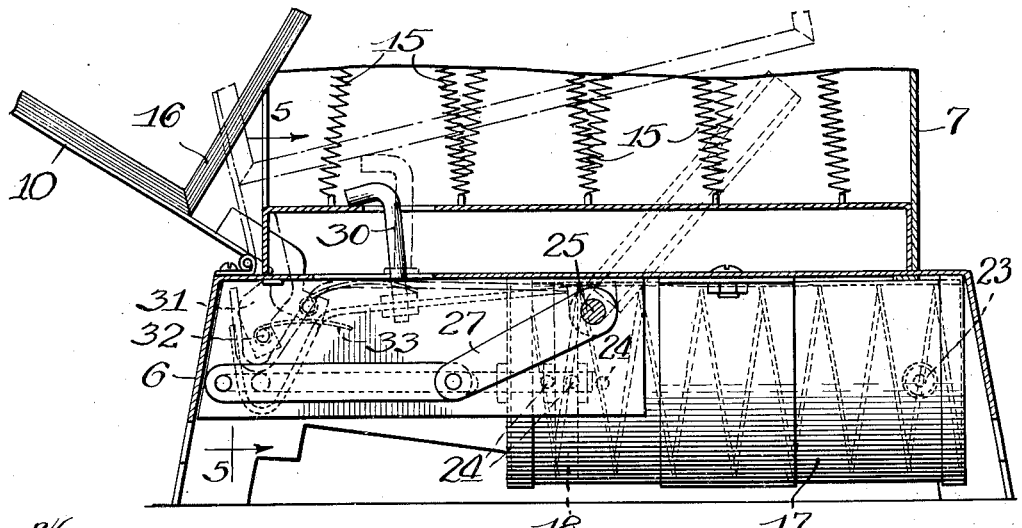
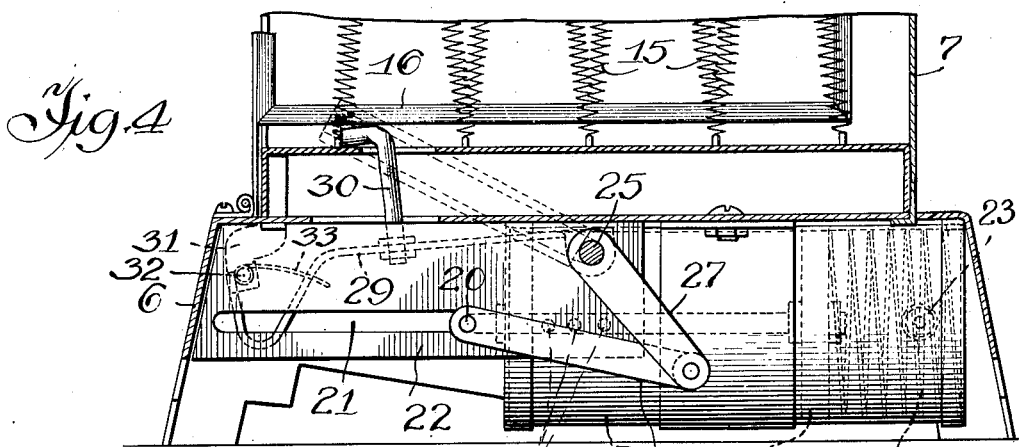
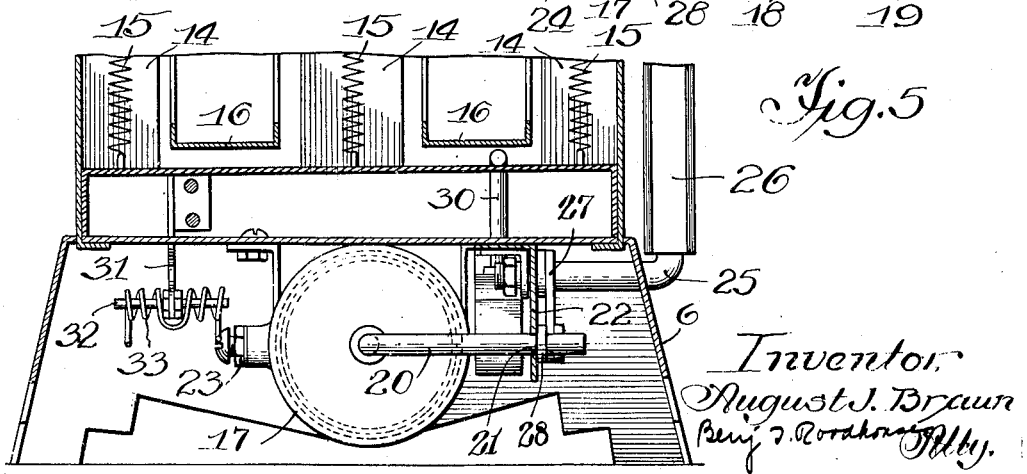

2,005,253

UNITED STATES PATENT OFFICE 2,005,253

TOASTER

August J. Braun, Chicago, Ill.

Application January 20, 1934, Serial No. 707,443

1 Claim. (Cl. 161—16)

My present invention relates to improvements in toasters. It has been my object to provide in a toaster, which has automatic means for ending the toasting operations, simple means for setting the organization for accomplishing its cycle of operations, and I have shaped and arranged the divers elements going into the construction of the toaster so that these elements can be economically produced and assembled to secure a toaster of dependable operation and sturdy construction and capable of long usefulness.

I have illustrated my invention in connection with a toaster of what may be called the "oven type", as shown in the accompanying drawings, in which—

Fig. 1 is a side elevation of a toaster embodying my invention with the bread holding element in open position for receiving the bread, Fig. 2 is a bottom plan, to an enlarged scale, of the structure shown in Fig. 1, Fig. 3 is a fragmental sectional view, to a still larger scale, of the lower portion of the toaster showing the commencement of the opening operation in dotted lines and the completion thereof in full lines, Fig. 4 is a view similar to Fig. 3 showing the instrumentalities in a closed or set position, and Fig. 5 is a central sectional view transverse to the section shown in Figs. 3 and 4, on line 5—5 of Fig. 3.

Similar reference characters refer to similar parts throughout the respective views.

The toaster comprises a base 6, within which the mechanism for timing the toasting operations and opening the apparatus is mounted, upon which base is carried the oven 7. The oven is made in two parts, one part comprising the side walls 8 and one end wall 9 permanently secured together and a second portion comprising the opposite end wall 10 and top wall 11. The lower end of the end wall 10 is pivoted to the base 6 between the side walls 8 in such a manner that when the end wall 10 is swung into vertical position the top wall 11 will extend between the top of the end wall 10 and the top of the end wall 9. Handles 12 are secured exteriorly of the end walls 9 and 10 and a handle 13 is secured upon the top wall 11. Frames 14, as most clearly shown in Figs. 2 and 5, are secured between the side walls 8 in spaced relation so as to receive a slice of bread to be toasted between such frames, and up and down between the top and bottom plates of the frames 14 are arranged suitable coils 15 of resistance metal which constitute the heating elements for the toaster. Suitable frames 16 are also secured to the end wall 10 and top wall 11 of a size to receive the bread to be toasted, which frames 16 are spaced to enter between the frames 14 when the end wall 10 and top wall 11 are swung into closed position.

To time the toasting operation I employ a cylinder 17 mounted substantially centrally of the base 6 in which cylinder is a piston 18 yieldingly pressed toward the inner end of the cylinder by a coil spring 19. The piston rod 20, extending from the piston 18, as most clearly shown in Fig. 2, has the outer end thereof, which extends through the inner end of the cylinder, bent at 90°, which bent end extends through a slot 21 provided in the flange of an angle plate 22, the other flange or web whereof is secured to the bottom side of the top of the base 6.

Adjacent the spring end of the cylinder 17 is a needle valve 23 through the adjustment of which the entry of air behind the piston 18 may be controlled so as to time the action of the spring 19. Adjacent its inner end the cylinder 17 is perforated at 24 to permit a greater inrush of air after the cylinder has passed the perforation 24 so as to permit a rapid movement of the piston rod 20 at the end of its travel.

As most clearly shown in Fig. 2, I journal in the angle plate 22 and the side wall of the base 6 lying nearest to and parallel with the angle plate a shaft 25, the portion of which shaft which extends through and outside of the wall of the base being turned at right angles and provided with a handle 26.

Fixedly secured to the shaft 25 is a crank arm 27, to the outer end of which is pivoted a link 28, the other end whereof engages with the turned end portion of the piston rod 20. The crank arm 27 is preferably so positioned upon the shaft 25 as to force the piston 18 into the cylinder 17 and compress the spring 19 when the handle 26 has been moved as far as it will go in an anti-clockwise direction.

Pivoted to rotate about the shaft 25 is a plate 29, the end whereof, opposite to that pivoted to the shaft 25, is bent downwardly at an incline into the path of the turned end of the piston rod 20 so that when the piston 18 moves beyond the aperture 24 and is thrown forward by the spring 19 the turned end portion of the piston rod 20 engages the downwardly bent end of the plate 29 and throws the same upwardly.

Secured to the plate 29 is a stud bolt 30 which extends upwardly through a perforation provided in the top wall of the base 6. The upper end of the stud bolt 30 is bent at right angles and is proportioned to come closely adjacent to an edge of the frame 16 when the plate 29 is in its lowermost position and the frame 16 closed within the oven portion of the toaster.

Secured to and depending from the pivoted end wall 10 is an arm 31. The arm 31 extends through a slot in the top of the base 6. Through the arm 31 is arranged a pin 32 about which pin is coiled a spring 33, the ends whereof are disposed to engage the lower face of the top of the base 6 as the end wall 10 approaches its fully opened position. This arrangement secures the cushioning of the opening portion of the oven when it is approaching its fully opened position.

The operation of my toaster is as follows: After the heating elements 15 have been connected with a source of current supply through the leads 34, slices of bread are inserted in the frames 16 and the swingout portion of the oven, consisting of the end wall 10 and top wall 11 are moved into closed position. The handle 26 is then rotated into an anti-clockwise direction as far as it will go, which effects through the crank arm 27 and link 28 the movement of the piston 18 so as to compress the spring 19. The atmospheric pressure of the air maintains the piston in its inward position and the spring 19 under compression until air enters behind the piston through the needle valve 23. This needle valve can be set so that the flow of air therethrough can be entirely stopped or regulated to pass any amount of air, thereby permitting the apparatus to be easily adjusted for toasting stale or dry bread or freshly baked or moist bread and to any degree of brownness which the operator may desire. After such amount of air has entered the cylinder through the needle valve 23 as to permit the piston 18 to pass beyond the aperture 24 the spring 19 is relieved from atmospheric impediment and moves the piston quickly forward, thereby projecting the turned or bent end of the piston rod 20 against the downwardly bent end of the pivoted plate 29, thereby forcing the plate 29 upwardly and the stud bolt 30 carried by the plate 29 is projected against a portion of the frame 16 which causes the pivoting of the end wall 10 to which is attached the top wall 11 and frame 16 into the open position most clearly shown in Fig. 1.

No nicety of adjustment of the needle valve 23 is required in the usual operation of my toaster, but it is possible to adjust the needle valve to any degree of nicety, thereby securing a timing of the action of the device which will suit the most critical of operators. All that is required in the use of my device is the insertion of the bread, the closing of the oven and the setting of the handle 26. The parts are few and simple. There is nothing to get out of order and the toaster is extremely efficient, owing to the fact that all the heat generated is closed within the oven during the toasting operation.

Having described my invention what I claim as new and desire to secure by Letters Patent is:

A toaster comprising a compartment having a pivoted closure, heating elements arranged in spaced relation within said compartment, bread holding elements spaced to enter between said heating elements secured to said pivoted closure, means for opening said pivoted closure comprising a rotatable shaft, a handle for rotating said shaft, a crank arm fixedly carried by said shaft, a link pivoted to said crank arm, a guide for said link, a cylinder, a piston therein, a spring for urging said piston in one direction, a valve for admitting air to said cylinder to control the action of said spring, said cylinder having an aperture to release the control of said spring adjacent one end of the movement of said piston, a piston rod bent at right angles and having the right angled end thereof secured to the guided end of said link, and means operable by the bent end of said piston rod for moving said closure into open position.

AUGUST J. BRAUN.